United States Patent [19]
Chen

[11] Patent Number: 5,884,639
[45] Date of Patent: Mar. 23, 1999

[54] CRYSTAL GELS WITH IMPROVED PROPERTIES

[75] Inventor: John Y. Chen, Pacifica, Calif.

[73] Assignee: Applied Elastomerics, Inc., South San Francisco, Calif.

[21] Appl. No.: 819,675

[22] Filed: Mar. 17, 1997

Related U.S. Application Data

[63] Continuation-in-part of Ser. No. 719,817, Sep. 30, 1996, and a continuation-in-part of Ser. No. 665,343, Jun. 17, 1996, and a continuation-in-part of Ser. No. 612,586, Mar. 8, 1996.

[51] Int. Cl.$^6$ .............................. B61C 15/00; C08J 5/02; C08J 51/00; C08K 5/01

[52] U.S. Cl. .................... 132/321; 428/521; 524/270; 524/474; 524/476; 524/490; 524/505; 525/95; 525/98

[58] Field of Search ..................... 529/474, 476, 529/505; 525/95, 98; 132/321

[56] References Cited

U.S. PATENT DOCUMENTS

| | | | |
|---|---|---|---|
| 3,772,234 | 11/1973 | Porter | 524/534 |
| 4,880,878 | 11/1989 | Himes et al. | 525/98 |
| 5,262,468 | 11/1993 | Chen | 524/476 |
| 5,334,646 | 8/1994 | Chen | 524/474 |
| 5,336,708 | 8/1994 | Chen | 524/474 |
| 5,508,334 | 4/1996 | Chen | 524/474 |
| 5,633,286 | 5/1997 | Chen | 5224/474 |
| 5,755,243 | 5/1998 | Roberts et al. | 132/321 |

*Primary Examiner*—Herbert J. Lilling

[57] ABSTRACT

Novel crystal gels and articles are formed from one or more of a linear SEBS or radial $(SEB)_n$ triblock copolymers having a selected crystalline midblock segment and high levels of a plasticizer, said midblock segment having an amount of crystallinity in the EB copolymer sufficient to achieve improvements in one or more physical properties including improved crack propagation resistance, improved tear resistance, improved resistance to fatigue and resistance to catastrophic failure not obtainable in amorphous SEBS gels.

9 Claims, No Drawings ized by the random placement of their polymer units along the chain, while the block copolymers have long segments of repeating units of the same chemical structure. SEBS block copolymers of styrene and ethylene butylene are known to form gels with various hydrocarbon oils. Such oil extended gels find uses in cable filling applications as disclosed in U.S. Pat. No. 4,176,240 and toy articles disclosed in U.S. Pat. No. 4,369,284. The triblock copolymers used in all these cases have substantially non-crystalline midblocks.

CRYSTAL GELS WITH IMPROVED PROPERTIES

RELATED APPLICATIONS

This application is a continuation-in-part of the following applications: U.S. Ser. No: 08/719,817 filed Sep. 30, 1996, U.S. Ser. No: 08/665,343 filed Jun. 17, 1996 and U.S. Ser. No: 612,586 filed Mar. 8, 1996 which applications are specifically incorporated herein by reference.

FIELD OF THE INVENTION

The present invention is directed to novel styrene-ethylene-butylene-styrene (SEBS) triblock copolymer gels.

BACKGROUND OF THE INVENTION

The random mixtures of ethylene and butylene midblock copolymer segment of conventional SEBS triblock copolymers is almost totally amorphous, substantially free of any crystantillity or non-crystalline. Such SEBS triblock copolymers with substantially non-crystalline ethylene-butylene elastomer midblock segment are used for making elastomeric gels of varying rigidities which can vary from soft to firm. Such gels are hereafter referred to as "non-crystalline midblock gels" or "amorphous midblock gels" or more simply "amorphous gels". Generally, the properties of amorphous gels increase with increasing gel rigidity. The amorphous gels at any rigidity, however, can fail catastrophically when cut or notched while under applied forces of high dynamic and static deformations, such as extreme compression, torsion, high tension, high elongation, and the like. Additionally, the development of cracks or crazes resulting from a large number of deformation cycles can induce catastrophic fatigue failure of amorphous gel composites, such as tears and rips between the surfaces of the amorphous gel and substrates or at the interfaces of interlocking material(s) and amorphous gel. Consequently, such amorphous gels are inadequate for the most demanding applications involving endurance at high stress and strain levels over an extended period of time.

SUMMARY OF THE INVENTION

I have now discovered novel gels with improved properties made from SEBS triblock and $(SEB)_n$ radial copolymers with crystalline ethylene-butylene elastomer midblock segment (hereafter referred to as "crystalline midblock gels" or "crystalline gels" or simpler "crystal gels"). The advances in improved properties of the crystal gels over amorphous gels are many, these include: improved damage tolerance, improved crack propagation resistance, improved tear resistance, improved resistance to fatigue, etc. Such crystal gels are advantageous for end-use involving repeated applications of stress and strain resulting from large number of cycles of deformations, including compression, compression-extension (elongation), torsion, torsion-compression, torsion-elongation, tension, tension-compression, tension-torsion, etc. The improvements of the crystal gel physical properties are an advance in the gel art not obtainable by amorphous gels at corresponding gel rigidities.

The crystal gels of the invention comprises: (I) 100 parts by weight of one or more high viscosity triblock copolymers of the general configurations poly(styrene-ethylene-butylene-styrene), poly(styrene-ethylene-butylene)$_n$ or a mixture thereof, wherein the subscript n denotes an integer; (II) a selected amount of a plasticizer sufficient to achieve a gel rigidity of from less than about 2 gram Bloom to about 1,800 gram Bloom; wherein said ethylene-butylene being a midblock copolymer segment of said triblock copolymers having a selected amount of crystallinity sufficient to achieve improvements in one or more properties including improved tear resistance and improved resistance to fatigue; wherein said improvements in properties of said crystal gel being greater than an amorphous gel at corresponding said gel rigidity formed from said triblock copolymers having a substantially non-crystalline ethylene-butylene midblock segment; said selected amount of crystallinity is capable of exhibiting a broad melting endotherm in differential scanning calorimeter (DCS) curves as seen on heating and a sharp crystallization exotherm as seen on cooling; (iii) optionally in combination with a selected amount of one or more of a selected polymer or copolymer selected from the group consisting of poly(styrene-butadiene-styrene), poly(styrene-butadiene), poly(styrene-isoprene-styrene), poly(styrene-isoprene), poly(styrene-ethylene-propylene), poly(styrene-ethylene-propylene-styrene), poly(styrene-ethylene-butylene-styrene), poly(styrene-ethylene-butylene), poly(styrene-ethylene-propylene)n, poly(styrene-ethylene-butylene)n, maleated poly(styrene-ethylene-propylene-styrene), maleated poly(styrene-ethylene-butylene-styrene), maleated poly(styrene-ethylene-butylene), maleated poly(styrene-ethylene-propylene)n, maleated poly(styrene-ethylene-butylene)n, polystyrene, polybutylene, poly(ethylene-propylene), poly(ethylene-butylene), polypropylene, polyethylene, polyethyleneoxide, poly(dimethylphenylene oxide), copolymers of trifluoromethyl-4,5-difuoro-1,3-dioxole and tetrafluoroethylene, tetrafluoroethylene, polycarbonate, ethylene vinyl alcohol copolymer, polyamide or polydimethylsiloxane; wherein said selected copolymer is a linear, branched, radial, or multiarm copolymer.

The crystal gels of the invention are also suitable in physically interlocking with other selected materials to form composites combinations. The materials are selected from the group consisting of paper, foam, plastic, fabric, metal, metal foil, concrete, wood, glass, glass fibers, ceramics, synthetic resin, synthetic fibers or refractory materials.

The ethylene-butylene (EB) and styrene (S) portions of the linear and radial triblock copolymers are incompatible and form a two or more phase system consisting of sub-micron glassy domains of styrene S interconnected by flexible EB chains. These domains serve to crosslink and reinforce the structure. This physical elastomeric network structure is reversible, and heating the polymer above the softening point of the glassy domains temporarily disrupt the structure, which can be restored by lowering the temperature.

Advantageously, the elastomer midblock segment should have a crystallinity of at least about 10% by weight of said ethylene-butylene elastomer midblock segment, more advantageously at least about 15%, still more advantageously at least about 20%, especially advantageously at least about 25% and especially more advantageously at least about 30% and higher. Broadly, the crystallinity by weight of the midblock segment should range from at least about 10% to about 80%. Because of the crystallinity of the elastomer midblock segment, the crystal gels exhibit different characteristics than amorphous gels. The differences are most evident in differential scanning calorimeter (DCS) curves of crystal gels, the melting endotherm is seen on heating and a sharp crystallization exotherm is seen on cooling. Such midblock crystallization endothermic and exothermic characteristics are missing from DCS curves of substantially amorphous gels.

As used herein, the term "gel rigidity" in gram Bloom is determined by the gram weight required to depress a gel a distance of 4 mm with a piston having a cross-sectional area of 1 square centimeter at 23° C.

Regarding resistance to fatigue, fatigue (as used herein) is the decay of mechanical properties after repeated application of stress and strain. Fatigue tests give information about the ability of a material to resist the development of cracks or crazes resulting from a large number of deformation cycles. Fatigue test can be conducted by subjecting samples of amorphous and crystal gels to deformation cycles to failure (appearance of cracks, crazes, rips or tears in the gels).

Tensile strength can be determined by extending a selected gel sample to break as measured at 180° U bend around a 5.0 mm mandrel attached to a spring scale. Likewise, tear strength of a notched sample can be determined by propagating a tear as measured at 180° U bend around a 5.0 mm diameter mandrel attached to a spring scale.

The various aspects and advantages will become apparent to those skilled in the art upon consideration of the accompanying disclosure.

DESCRIPTION OF THE INVENTION

Thermoplastic elastomer SEBS gels are described in my earlier applications and patents: U.S. Ser. Nos: 581,188 filed Dec. 29, 1995; 581,191 filed Dec. 29, 1995; 581,125 filed Dec. 29, 1995; PCT/US94/04278 filed Apr. 19, 1994; PCT/US94/07314 filed Jun. 27, 1994; 288,690 filed Aug. 11, 1994; 152,734, filed Nov. 15, 1993; 152,735, Nov. 15, 1993; 114.688, filed Aug. 30, 1993; 935,540 filed Aug. 24, 1992; 876,118 filed Apr. 29, 1992; 705,096 filed May 23, 1991; 527,058 filed May 21, 1990; 921,752 filed Oct. 21, 1986; 458,703, filed Jan. 17, 1983; 916,731, filed Jun. 19, 1978; 815,315, filed Jul. 13, 1977; 778,343, filed Mar. 17, 1977; U.S. Pat. Nos. 5,262,468; 5,153,254; 4,618,213; and 4,369, 284. Various patents on thermoplastic elastomers are described in U.S. Pat. Nos. 3,595,942, Reissue 27,145-28, 236; 3,772,234; 4,116,917; and 4,687,815. Other non-patent publications related to SEBS polymers include: W. P. Gergen, "Uniqueness of Hydrogenated Block Copolymers for Elastomeric Applications," presented at the German Rubber Meeting, Wiesbaden, 1983; Kautsch, Gummi, Kunstst. 37, 284 (1984). W. P. Gergen, et al., "Hydrogenated Block Copolymers," Paper No. 57, presented at a meeting of the Rubber Division ACS, Los Angeles, Apr. 25, 1985. Encyclopedia of Polymer Science and Engineering, Vol. 2, pp 324–434, "Block Copolymers". L. Zotteri and et al., "Effect of hydrogenation on the elastic properties of poly (styrene-b-diene-b-styrene) copolymers", Polymer, 1978, Vol. 19, April. J. Kenneth Craver, et al., Applied Polymer Science, Ch. 29, "Chemistry and Technology of Block Polymers", pp. 394–429, 1975. Y. Mahajer and et al., "The influence of Molecular Geometry on the Mechanical Properties of homopolymers and Block Polymers of Hydrogenated Butadiene and Isoprene" reported under U.S. ARO Grant No. DAAG29-78-G-0201. J. E. McGrath, et al., "Linear and Star Branched Butadiene-Isoprene Block Copolymers and Their Hydrogenated Derivatives", Chem. Dept, Virginia Polytechnic Institute and State University Blacksturg, VA, reported work supported by Army Research Office. Legge, Norman R., "Thermoplastic Elastomers", Charles Goodyear Medal address given at the 131st Meeting of the Rubber Division, American Chemical Society, Montreal, Quebec, Canada, Vol. 60, G79–G115, May 26–29, 1987. Falk, John Carl, and et al., "Synthesis and Properties of Ethylene-Butylene-1 Block Copolymers", Macromolecules, Vol. 4, No. 2, pp. 152–154, March–April 1971. Morton, Maurice, and et al., "Elastomeric Polydiene ABA Triblock Copolymers within Crystalline End Blocks", University of Arkon, work supported by Grant No. DMR78-09024 from the National Science Foundation and Shell Development Co. Yee, A. F., and et al., "Modification of PS by SEBS Block Copolymers: Effect of Block Length", General Electric Corporate Research & Development, Schenectady, N.Y. 12301. Siegfried, D. L., and et al., "Thermoplastic Interpenetrating Polymer Networks of a Triblock Copolymer elastomer and an Ionomeric Plastic Mechanical Behavior", Polymer Engineering and Science, Jan. 1981, Vol. 21, No.1, pp 39–46. Clair, D. J., "SEBS Copolymers Exhibit Improved Wax Compatibility", Adhesives Age, November, 1988. Shell Chemical Technical Bulletin SC:1102–89, "Kratone® Thermoplastic Rubbers in oil gels", April 1989. The above applications, patents and publications are specifically incorporated herein by reference.

Legge's paper teaches the development of (conventional substantially amorphous elastomer midsegment) SEBS triblock copolymers. In the polymerization of butadiene by alkyllithium initiators, 1,4-addition or 1,2-addition polymers, mixtures, can be obtained. In forming styrene butadiene triblock copolymers involving the addition of solvating agents such as ethers just before the final styrene charge is added, any excess of ethers can alter the polybutadiene structure from a 1,4-cis or trans structure to a 1,2- or 3,4-addition polymer. Using difunctional coupling agent would give linear block copolymers and multifuntional agents would give star-shaped or radial block copolymers. Hydrogenation of the 1,4-polybutadiene structure yields polyethylene, while that of the 1,2-polybutadiene yields polybutylene. The resulting polyethylene will be essentially identical with linear, high-density polyethylene with a melting point, Tm, of about 136° C. Hydrogenation of 1,2-polybutadiene would yield atactic poly(1-butene) (polybutylene). The Tg of polybutylene is around −18° C. Random mixtures of ethylene and butylene units in the chain would suppress crystallinity arising from polyethylene sequences. The objective for a good elastomer should be to obtain a saturated olefin elastomeric segment with the lowest possible Tg and the best elastomeric properties. Such an elastomer favored using styrene as the hard-block monomer and selecting the best monomer for hydrogenation of the elastomer midsegment. Using a mixture of 1,4- and 1,2-polybutadiene as the base polymer for the midsegment would result in an ethylene/butylene midsegment in the final product. The elements of selection of the midsegment composition is elastomer crystallinity and the elastomer Tg of an ethylene/butylene copolymer. Very low levels of crystallinity can be achieved around 40–50% butylene concentration. The minimum in dynamic hysteresis around 35% butylene concentration in the elastomeric copolymer. A value of 40% butylene concentration in the ethylene/butylene midsegment was chosen for the SEBS block copolymers.

Clair's paper teaches that the EB midblock of conventional SEBS polymers is a random copolymer of ethylene and 1-butene exhibiting nearly no crystallinity in the midblock. In the preparation of ethylene-butylene (EB) copolymers, the relative proportions of ethylene and butylene in the EB copolymer chain can be controlled over a broad range from almost all ethylene to almost all butylene. When the EB copolymer is nearly all ethylene, the methylene sequences will crystallize exhibiting properties similar to low density polyethylene. In differential scanning calorimeter (DCS) curves, the melting endotherm is seen on heating and a sharp crystallization exotherm is seen on cooling. As the amount of butylene in the EB copolymer is increased, the methylene sequences are interrupted by the ethyl side chains which shorten the methylene sequences length so as to reduce the amount of crystallinity in the EB copolymer. In conventional SEBS polymers, the amount of 1-butene is controlled at a high enough level to make the EB copolymer midblock almost totally amorphous so as to make the copolymer rubbery and soluble in hydrocarbon solvents.

An SEBS polymer retaining at least some crystallinity in the EB copolymer midblock may be desirable. Therefore, a new family of SEBS polymers are developed (U.S. Pat. No. 3,772,234) in which the midblock contains a higher percentage of ethylene. The molecular weights of the new crystalline midblock segment SEBS polymers can vary from low molecular weight, intermediate molecular, to high molecular weight; these are designated GR-3, GR-1, and GR-2 respectively.

The broad melting endotherm in DSC curves of the new SEBS polymers are much higher than conventional SEBS polymers. The maximum in the broad endortherm curves of the new SEBS polymers occurs at about 40° C., but can range from greater than about 25° C. to about 60° C. and higher. Advantageously, the new crystalline EB copolymer midblock segment SEBS polymers can exhibit melting endotherms (as shown by DSC) of about 20° C. to about 75° C. and higher. More specific melting endotherm values of the new crystalline midblock segment SEBS triblock copolymers include: about 20° C., 21° C., 22° C., 23° C., 24° C., 25° C., 26° C., 27° C., 28° C., 29° C., 30° C., 31° C., 34° C., 35° C., 36° C., 37° C., 38° C., 39° C., 40° C., 41° C., 42° C., 43° C., 44° C., 45° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., and higher, whereas, the melting endotherm (DSC) for conventional amorphous midblock segment SEBS triblock copolymers are about 10° C. or lower.

Since hydrogenation of 1,4-polybutadiene structure yields substantially linear, high-density polyethylene with a melting point, $T_m$, of about 136° C., by selecting linear or radial block copolymers and the proper 1,4-polybutadiene and 1,2-polybutadiene ratios, linear low density, medium-density and high-density polyethylene crystalline midblock segment SEBS and (SEB)$_n$ polymers can be prepared. Unexpectly, the highest molecular weight polymer, GR-2 exhibits an anomalously low softening point. Moreover, the tensile strength of the crystal gels also increases with increases in molecular weight (i.e. increases in viscosity).

The selected amount of crystallinity in the EB copolymer should be sufficient to achieve improvements in one or more physical properties including improved damage tolerance, improved crack propagation resistance, improved tear resistance, improved resistance to fatigue of the bulk gel and resistance to catastrophic fatigue failure of crystal gel composites, such as between the surfaces of the crystal gel and substrate or at the interfaces of the interlocking material (s) and crystal gel, which improvements are not found in amorphous gels at corresponding gel rigidities. As an example, when fabric interlocked or saturated with amorphous SEBS gels (gel composites) are used as gel liners for lower limb or above the knee prosthesis to reduce pain over pressure areas and give relief to the amputee, the commonly used amorphous gels forming the liners can tear or rip apart during marathon racewalk after 50–70 miles. In extended use, the amorphous gels can rip on the bottom of the liner in normal racewalk training of 40–60 miles over a six weeks period. In such demanding applications, the crystal gels are especially advantageous and is found to have greater tear resistance and resistance to fatigue resulting from a large number of deformation cycles than amorphous gels.

The (I) linear triblock and radial copolymers utilized in forming the crystal gels of the invention are characterized as having an ethylene to butylene midblock ratio (E:B) of about 85:15 to about 65:35. Advantageously, the butylene concentration of the midblock is about 35% or less, more advantageously, about 30% or less, still more advantageously, about 25% or less, especially advantageously, about 20% or less. Advantageously, the ethylene to butylene midblock ratios can range from about 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34 to about 65:35.

The SEBS and (SEB)$_n$ copolymers forming the crystal gels can have a broad range of styrene to ethylene-butylene ratios (S:EB) of about 20:80 or less to about 40:60 or higher. The S:EB weight ratios can range from lower than about 20:80 to above about 40:60 and higher. More specifically, the values can be 15:85, 19:81, 20:80, 21:79. 22:78. 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49 52:48 and etc. Other ratio values of less than 19:81 or higher than 51:49 are also possible. Broadly, the styrene block to elastomeric block ratio of the high viscosity liner and star copolymers is about 20:80 to about 40:60 or higher, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and still more preferably about 30:70.

In general, for block copolymers, various measured viscosities of 5, 10, 15, and 20, weight percent solution values in toluene at 30° C. can be extrapolated to a selected concentration. For example, a solution viscosity of a 5 weight percent copolymer solution in toluene can be determined by extrapolation of 10, 15, and 20 weight percent measurements to 5 weight percent concentration.

Of most advantage, high viscosity crystalline midblock segment SEBS triblock copolymers can have Brookfield viscosities at 5 weight percent solution in toluene at 30° C. of from about 40 to about 50, 60, 70, 80, 90, 100 . . . 120, 150, 200, 380, 500, 1,000 cps and higher, while viscosities of star-shaped tiblock copolymers are 25, 50, 100, 150, 200, cps and higher. Due to structural variations between the linear tiblock and star-shaped copolymers, the high viscosity star-shaped or radial copolymers, typically, may exhibit a lower Brookfield Viscosity value than its counterpart linear tiblock copolymers. However, when the tiblock copolymers are considered as star-shaped or branched, then at equal branch lengths, the solution viscosities of the tiblock copolymers and branched copolymers are about the same or equivalent.

The crystal gels can optionally comprise selected major or minor amounts of one or more polymers or copolymers (III) provided the amounts and combinations are selected without substantially decreasing the desired properties. The polymers and copolymers can be linear, star-shaped (radial), branched, or multiarm; these including: (SBS) styrenebutadiene-styrene block copolymers, (SIS) styrene-isoprene-styrene block copolymers, low and medium viscosity (SEBS) styrene-ethylene-butylene-styrene block copolymers, (SEP) styrene-ethylene-propylene block copolymers, (SEPS) styrene-ethylene/propylene-styrene block copolymers, (SE-EPS) styrene-ethylene-ethylene/propylene-styrene block copolymers, $(SB)_n$ styrene-butadiene and $(SEB)_n$, $(SEBS)_n$, $(SE-EP)_n$, $(SEP)_n$, $(SI)_n$ styrene-isoprene multi-arm, branched or star-shaped copolymers, polyethyleneoxide (EO), poly (dimethylphenylene oxide), teflon (TFE, PTFE, PEA, FEP, etc), optical clear amorphous copolymers based on 2,2-bistrifluoromethyl-4,5-difuoro-1,3-dioxole (PDD) and tetrafluoroethylene (TFE), maleated SEBS triblock copolymer, polycarbonate, ethylene vinyl alcohol copolymer, and the like. Still, other (III) polymers include homopolymers which can be utilized in minor amounts; these include: polystyrene, polybutylene, polyethylene, polypropylene, polydimethylsiloxane, etc. The conventional term "major" means about 51 weight percent and higher (e.g. 55%, 60%, 65%, 70%, 75%, 80% and the like) and the term "minor" means 49 weight percent and lower (e.g. 2%, 5%, 10%, 15%, 20%, 25% and the like).

Example of (III) polymers, copolymers, and blends include: (a) Kraton G 1651, G 1654X; (b) Kraton G 4600; (c) Kraton G 4609; other suitable high viscosity polymer and oils include: (d) Tuftec H 1051; (e) Tuftec H 1041; (f) Tuftec H 1052; (g) Kuraray SEPS 4033; (h) Kuraray SEBS 8006; (i) Kuraray SEPS 2005; (j) Kuraray SEPS 2006 , and (k) blends (polyblends) of (a)–(h) with other polymers and copolymers include: (1) SEBS-SBS; (2) SEBS-SIS; (3) SEBS-(SEP); (4) SEBS-$(SEB)_n$; (5) SEBS-$(SEB)_n$; (6) SEBS-$(SEP)_n$; (7) SEBS-$(SI)_n$; (8) SEBS-(SI) multiarm; (9) SEBS-$(SEB)_n$; (10) $(SEB)_n$ star-shaped copolymer; (11) s made from blends of (a)–(k) with other homopolymers include: (12) SEBS/polystyrene; (13) SEBS/polybutylene; (14) SEBS/poly-ethylene; (14) SEBS/polypropylene; (16) SEP/SEBS, (17) SEP/SEPS, (18) SEP/SEPS/SEB, (19), SEPS/SEBS/SEP, (20), SEB/SEBS (21), EB-EP/SEBS (22), SEBS/EB (23), SEBS/EP (24), (25) $(SEB)_n$ s, (26) $(SEP)_n$, (27) Kuraray 2007 (SEPS), (28) Kuraray 2002, (SEPS), (29) Kuraray 4055(S-E-EP-S) (30) Kuraray 4077(S-E-EP-S) (31) Kuraray 4045(S-E-EP-S) (32) $(S-E-EP)_n$, (33) $(SEB)_n$, (34) EPDM, (35) EPR, (36) EVA, (37) coPP, (38) EMA, (39) EEA, (40) DuPont Teflon AF amorphous fluoropolymers, (41) Dow polydimethylsiloxane, (42) maleated SEBS (maleation level 2–30%), (43) $(EP)_n$ and the like.

Representative examples of commercial elastomers that can be combined with the tiblock and star-shaped copolymers (I) described above include: Shell Kratons D1101, D1102, D1107, D1111, D1112, D1113X, D1114X, D1116, D1117, D1118X, D1122X, D1125X, D1133X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1650, G1651, G1652, G4609, G4600, G1654X, G2701, G2703, G2705, G1706, G2721X, G7155, G7430, G7450, G7523X, G7528X, G7680, G7705, G7702X, G7720, G7722x, G7820, G7821X, G7827, G7890X, G7940, FG1901X and FG1921X. Kuraray's SEP, SEPS, SEBS, S-E-EP-S Nos. 1001, 1050, 2027, 2003, 2006, 2007, 2008, 2023, 2043, 2063, 2050, 2103, 2104, 2105, 4033, 4045, 4055, 4077, 8004, 8006, 8007, H-VS-3 (S-V-EP-S) and the like.

The Brookfield Viscosity of a 5 weight percent solids solution in toluene at 30° C. of 2006, 4045, 4055, 4077 typically range about 20–35, about 25–150, about 60–150, about 200–400 respectively. Typical Brookfield Viscosities of a 10 weight percent solids solution in toluene at 30° C. of 1001, 1050, 2007, 2063, 2043, 4033, 2005, 2006, are about 70, 70, 17, 29, 32, 50, 1200, and 1220 respectively. Typical Brookfield Viscosity of a 25 weight percent solids solution in toluene at 25° C. of Kraton D1101, D1116, D1184, D1300X, G1701X, G1702X are about 4000, 9000, 20000, 6000, 50000 and 50000 cps respectively. Typical Brookfield Viscosity of a 10 weight percent solids solution in toluene at 25° C. of G1654X is about 370 cps. The Brookfield Viscosities of a 20 and 30 weight percent solids solution in toluene at 30° C. of H-VS-3 are about 133 cps and 350 cps respectively.

Suitable triblock copolymers (III) and their typical viscosities are further described. Shell Technical Bulletin SC:1393–92 gives solution viscosity as measured with a Brookfield model RVT viscometer at 25° C. for Kraton G 1654X at 10% weight in toluene of approximately 400 cps and at 15% weight in toluene of approximately 5,600 cps. Shell publication SC:68–79 gives solution viscosity at 25° C. for Kraton G 1651 at 20 weight percent in toluene of approximately 2,000 cps. When measured at 5 weight percent solution in toluene at 30° C., the solution viscosity of Kraton G 1651 is about 40. Examples of high viscosity SEBS triblock copolymers includes Kuraray's SEBS 8006 which exhibits a solution viscosity at 5 weight percent at 30° C. of about 51 cps. Kuraray's 2006 SEPS polymer exhibits a viscosity at 20 weight percent solution in toluene at 30° C. of about 78,000 cps, at 5 weight percent of about 27 cps, at 10 weight percent of about 1220 cps, and at 20 weight percent 78,000 cps. Kuraray SEPS 2005 polymer exhibits a viscosity at 5 weight percent solution in toluene at 30° C. of about 28 cps, at 10 weight percent of about 1200 cps, and at 20 weight percent 76,000 cps. Other grades of SEBS, SEPS, $(SEB)_n$, $(SEP)_n$ polymers can also be utilized in the present invention provided such polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene (S:EB) weight ratios for the Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values. In the case of Kuraray's SEBS polymer 8006 the S:EB weight ratio is about 35:65. In the case of Kuraray's 2005 (SEPS), and 2006 (SEPS), the S:EP weight ratios are 20:80 and 35:65 respectively. The styrene to ethylene-ethylene/propylene (S:E-EP) ratios of Kuraray's SEPTON 4045, 4055, and 4077 are typically about 37.6, 30, 30 respectively. More typically the (S:E-EP) and (S:EP) ratios can vary broadly much like S:EB ratios of SEBS and $(SEB)_n$ from less than 19:81 to higher than 51:49 (as recited above) are possible. It should be noted that multiblock copolymers including SEPTON 4045, 4055, 4077 and the like are described in my cited copending parent applications and are the subject matter of related inventions.

The triblock copolymers (III) such as Kraton G 1654X having ratios of 31:69 or higher can be used and do exhibit about the same physical properties in many respects to Kraton G 1651 while Kraton G 1654X with ratios below 31:69 may also be use, but they are less advantageous due to their decrease in the desirable properties of the final gel.

Plasticizers (II) particularly advantageous for use in practicing the present invention are will known in the art, they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

Examples of representative commercially available plasticizing oils include Amoco® polybutenes, hydrogenated polybutenes, polybutenes with epoxide functionality at one end of the polybutene polymer, liquid poly(ethylene/butylene), liquid hetero-telechelic polymers of poly(ethylene/butylene/styrene) with epoxidized polyisoprene and poly(ethylene/butylene) with epoxidized polyisoprene: Example of such polybutenes include: L-14 (320 Mn), L-50 (420 Mn), L-100 (460 Mn), H-15 (560 Mn), H-25 (610 Mn), H-35 (660 Mn), H-50 (750 Mn), H-100 (920 Mn), H-300 (1290 Mn), L-14E (27–37 cst @ 100° F. Viscosity), H-300E (635–690 cst @ 210° F. Viscosity), Actipol E6 (365 Mn), E16 (973 Mn), E23 (1433 Mn), Kraton L-1203, EKP-206, EKP-207, HPVM-2203 and the like. Example of various commercially oils include: ARCO Prime (55, 70, 90, 200, 350, 400 and the like), Duraprime and Tufflo oils (6006, 6016, 6016M, 6026, 6036, 6056, 6206, etc) , other white mineral oils include: Bayol, Bernol, American, Blandol, Drakeol, Ervol, Gloria, Kaydol, Litetek, Lyondell (Duraprime 55, 70, 90, 200, 350, 400, etc), Marcol, Parol, Peneteck, Primol, Protol, Sontex, Witco brand white oils including RR-654-P and the like. Generally, plasticizing oils with average molecular weights less than about 200 and greater than about 700 may also be used (e.g., H-300 (1290 Mn)).

Comparisons of oil extended SEBS triblock copolymers have been described in Shell Chemical Company Technical Bulletin SC:1102–89 (April 1989) "KRATON®THERMOPLASTIC RUBBERS IN OIL GELS" which is incorporated herein by reference.

The crystal gels can be made non-adhearing, non-sticking, (non-tacky), by incorporating an advantage amount of stearic acid (octadecanoic acid), metal stearates (e.g., calcium stearate, magnesium stearate, zinc stearate, etc.), polyethylene glycol distearate, polypropylene glycol ester or fatty acid, and polytetramethylene oxide glycol disterate, waxes, stearic acid and waxes, metal stearate and waxes, metal stearate and stearic acid. The use of stearic acid alone do not reduce tack. The amount of stearic acid is also important. As an example, ratio of 200 grams stearic acid to 2,000 gram of SEBS (a ratio of 0.1) will result in spotted tack reduction on the surface of the gel. A ratio of 250 to 2,000 will result in spotted crystallized stearic acid regions on the surface of the gel or spotted tack reduction. A ratio of 300 to 2,000 will result in complete tack reduction with large stearic acid crystallized regions on the surface of the gel. When microcrystalline waxes are incorporated together with stearic acid, the crystallization of stearic acid completely disappears from the surface of the gel. For example excellent result is achieved with 200 grams of stearic acid, 150 grams of microcrystalline wax and 2,000 grams of SEBS. The same excellent result is achieved when SEBS is adjusted to 3,000 grams, 4,000 grams, etc. The same result is achieved with (I) copolymers as well as in combination with polymers (III) such as SEPS, S-E-EP-S, $(S-E-EP)_n$, $(SEB)_n$, $(SEP)_n$ polymers.

The crystal gels can also contain useful amounts of conventionally employed additives such as stabilizers, antioxidants, antiblocking agents, colorants, fragrances, flame retardants, flavors, other polymers in minor amounts and the like to an extend not affecting or substantially decreasing the desired properties. Additives useful in the crystal gel of the present invention include: tetrakis [methylene 3,-(3'5'-di-tertbutyl-4"-hydroxyphenyl) propionate] methane, octadecyl 3-(3",5"-di-tert-butyl-4"-hydroxyphenyl) propionate, distearyl-pentaerythritol-diproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl]benzene), 4,4"-methylenebis(2,6-di-tert-butylphenol), steraric acid, oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, calcium sterate, other metal sterates, waxes (e.g., polyethylene, polypropylene, microcrystalline, carnauba, paraffin, montan, candelilla, beeswax, ozokerite, ceresine, and the like), teflon (TFE, PTFE, PEA, FEP, etc), polysiloxane, etc. The crystal gel can also contain metallic pigments (aluminum and brass flakes), TiO2, mica, fluorescent dyes and pigments, phosphorescent pigments, aluminatrihydrate, antimony oxide, iron oxides (Fe3O4, —Fe2O3, etc.), iron cobalt oxides, chromium dioxide, iron, barium ferrite, strontium ferrite and other magnetic particle materials, molybdenum, silicones, silicone fluids, lake pigments, aluminates, ceramic pigments, ironblues, ultramarines, phthalocynines, azo pigments, carbon blacks, silicon dioxide, silica, clay, feldspar, glass microspheres, barium ferrite, wollastonite and the like. The report of the committee on Magnetic Materials, Publication NMAB-426, National Academy Press (1985) is incorporated herein by reference.

The crystal gels can also be made into composites. The crystal gels can be casted unto various substrates, such as open cell materials, metals, ceramics, glasses, and plastics, elastomers, fluropolymers, expanded fluropolymers, Teflon (TFE, PTFE, PEA, FEP, etc), expanded Teflon, spongy expanded nylon, etc.; the molten crystal gel is deformed as it is being cooled. Useful open-cell plastics include: polyamides, polyimides, polyesters, polyisocyanurates, polyisocyanates, polyurethanes, poly(vinyl alcohol), etc. Suitable open-celled Plastic (sponges) are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference.

The crystal gels denoted as "G" can be physically interlocked with a selected material denoted as "M" to form composites as denoted for simplicity by their combinations $G_nG_n$, $G_nG_nG_n$, $G_nM_n$, $G_nM_nG_n$, $M_nG_nM_n$, $M_nG_nG_n$, $G_nG_nM_n$, $M_nM_nM_nG_n$, $M_nM_nM_nG_nM_n$, $M_nG_nG_nM_n$, $G_nM_nG_nG_n$, $G_nM_nM_nG_n$, $G_nM_nM_nG_n$, $G_nG_nM_nM_n$, $G_nG_nM_nG_nM_n$, $G_nM_nG_nG_nG_n,M_n$, $G_nM_nG_nM_nM_n$, MnGnMnGnMnGn, $G_nG_nM_nM_nG_n$, $G_nG_nM_nG_nM_nG_n$, and the like or any of their permutations of one or more $G_n$ with $M_n$ and the like, wherein when n is a subscript of M, n is the same or different selected from the group consisting of paper, foam, plastic, fabric, metal, concrete, wood, glass, ceramics, synthetic resin, synthetic fibers or refractory materials and the like; wherein when n is a subscript of G, n denotes the same or a different gel rigidity of from about 2 gram to about 1,800 gram Bloom). The crystal gels of the composites are formed from copolymers (I), polymers (III), and plasticizers (III) described above.

Sandwiches of crystal gel-material (i.e., crystal gel-material-crystal gel or material-crystal gel-material, etc.) are useful as dental floss, shock absorbers, acoustical isolators, vibration dampers, vibration isolators, and wrappers. For example the vibration isolators can be use under research microscopes, office equipment, tables, and the like to remove background vibrations. The tear resistance nature of the instant crystal gels are superior in performance to amorphous triblock copolymer gels which are much less resistance to crack propagation caused by long term continue dynamic loadings.

The crystal gels are prepared by blending together the components including other additatives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amounts of multiblock copolymers (I) and polymer (III) used. These components blend easily in the melt and a heated vessel equipped with a stirrer is all that is required. Small batches can be easily blended in a test tube using a glass stirring rod for mixing. While conventional large vessels with pressure and/or vacuum means can be utilized in forming large batches of the instant crystal gels in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than 10 rpm to about 40 rpm or higher.

The crystal gel articles can be formed by blending, injection molding, extruding, spinning, casting, dipping and other conventional methods. For example, Shapes having various cross-section can be extruded. The crystal gels can also be formed directly into articles or remelted in any suitable hot melt applicator and extruded into shaped articles and films or spun into threads, strips, bands, yarns, or other shapes. With respect to various shapes and yarn, its size are conventionally measured in denier (grams/9000 meter), tex (grams/1000 meter), and gage (1/2.54 cm). Gage, tex, denier can be converted as follows: tex=denier/9=specific gravity (2135/gage), for rectangular cross section, tex=specific gravity (5806×103) (th) (w)/9, where th is the thickness and w the width of the strip, both in centimeters. General descriptions of (1) block copolymers, (2) elastomeric fibers and conventional (3) gels are found in volume 2, starting at pp. 324–415, volume 6, pp 733–755, and volume 7, pp. 515 of *ENCYCLOPEDIA OF POLYMER SCIENCE AND ENGINEERING,* 1987 which volumes are incorporated herein by reference.

The crystal gels are excellent for cast molding and the molded products have various excellent characteristics which cannot be anticipated form the properties of the raw components. Other conventional methods of forming the composition can be utilized.

Not only do the crystal gels have all the desirable combination of physical and mechanical properties substantially similar to high viscosity amorphous SEBS gels such as high elongation at break of at least 1,600%, ultimate tensile strength of about $8\times10^5$ dyne/cm$^2$ and higher, low elongation set at break of substantially not greater than about 2%, substantially about 100% snap back when extended to 1,200% elongation, and a gel rigidity of substantially from about 2 gram to about 1,800 gram Bloom and higher, the crystal gels of the present invention exhibit improved tear resistance and resistance to fatigue not obtainable from amorphous SEBS gels at corresponding gel rigidities.

The crystal gels of the present invention exhibit one or more of the following properties. These are: (1) tensile strength of about $8\times10^5$ dyne/cm$^2$ to about $10^7$ dyne/cm$^2$ and greater; (2) elongation of less than about 1,600% to about 3,000% and higher; (3) elasticity modules of about $10^4$ dyne/cm$^2$ to about $10^6$ dyne/cm$^2$ and greater; (4) shear modules of about $10^4$ dyne/cm$^2$ to about $10^6$ dyne/cm$^2$ and greater as measured with a 1, 2, and 3 kilogram load at 23° C.; (5) gel rigidity of about less than about 2 gram Bloom to about 1,800 gram Bloom and higher as measured by the gram weight required to depress a gel a distance of 4 mm with a piston having a cross-sectional area of 1 square cm at 23° C.; (6) tear propagation resistance greater than the tear resistance of amorphous SEBS gels at corresponding gel rigidities; (7) resistance to fatigue greater than the fatigue resistance of amorphous SEBS gels at corresponding gel rigidities; (8) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C.

The crystal gel articles molded from the instant crystal gels have additional important advantages in that they end-use performance properties are greater than amorphous SEBS gels in that they are more resistant to cracking, tearing, crazing or rupture in flexural, tension, compression, or other deforming conditions of use. Like amorphous gels, the molded articles made from the instant composition possess the intrinsic properties of elastic memory enabling the articles to recover and retain its original molded shape after many extreme deformation cycles.

Because of their improved tear resistance and improved resistance to fatigue, the crystal gels of the present invention achieve greater performance than amorphous gels in low frequency vibration applications, such as viscoelastic layers in constrained-layer damping of mechanical structures and goods, as viscoelastic layers used in laminates for isolation of acoustical and mechanical noise, as anti-vibration elastic support for transporting shock sensitive loads, as vibration isolators for an optical table, as viscoelastic layers used in wrappings, enclosures and linings to control sound, as compositions for use in shock and dielectric encapsulation of optical, electrical, and electronic components.

Because of their improved tear resistance and improved resistance to fatigue, the crystal gels are more useful as molded shape articles for use in medical and sport health care, such use include therapeutic hand exercising grips, dental floss, crutch cushions, cervical pillows, bed wedge pillows, leg rest, neck cushion, mattress, bed pads, elbow padding, dermal pads, wheelchair cushions, helmet liner, cold and hot packs, exercise weight belts, traction pads and belts, cushions for splints, slings, and braces (for the hand, wrist, finger, forearm, knee, leg, clavicle, shoulder, foot, ankle, neck, back, rib, etc.), and also soles for orthopedic shoes. Other uses include various shaped articles as toys, optical uses (e.g., cladding for cushioning optical fibers from bending stresses) and various optical devices, as lint removers, dental floss, as tips for swabs, as fishing bate, as a high vacuum seal (against atmosphere pressure) which contains a useful amount of a mineral oil-based magnetic fluid particles, etc. Moreover, the casted, extruded, or spun threads, strips, yarns, tapes can be weaved into cloths, fine or coarse fabrics.

The crystal gels can be formed in any shape; the original shape can be deformed into another shape (to contact a regular or irregular surface) by pressure and upon removal of the applied pressure, the composition in the deformed shape will recover back to its original shape.

As an example of the versatility of use of the instant crystal gels, a hand exerciser can be made in any shape so long as it is suitable for use as a hand exerciser: a sphere shape, a cube shape, a rectangular shape, etc. Likewise, a wheelchair cushion can be made from the composition in any shape, so long as it meets the needs of the user of the cushion. For example, a cushion can be made by forming the composition into a selected shape matching the contours of the specific body part or body region. The composition can be formed into any desired shaped, size and thickness suitable as a cushion; the shaped composition can be additionally surrounded with film, fabric, foam, or any other desired material or combinations thereof. Moreover, the composition can be casted onto such materials, provided such materials substantially maintain their integrity (shape, appearance, texture, etc.) during the casting process. The same applies for brace cushions, liners, linings and protective coverings for the hand, wrist, finger, forearm, knee, leg, etc.

Because of their improved tear resistance and resistance to fatigue, the crystal gels exhibit versatility as balloons for medical uses, such as balloon for valvuloplasty of the mitral valve, gastrointestinal balloon dilator, esophageal balloon dilator, dilating balloon catheter use in coronary angiogram and the like. Since the crystal gels are more tear resistant, they are especially useful for making condoms, toy balloons, and surgical and examination gloves. As toy balloons, the crystal gels are safer because it will not rupture or explode when punctured as would latex balloons which often times cause injures or death to children by choking from pieces of latex rubber. The crystal gels are advantageously useful for making gloves, thin gloves for surgery and examination and thicker gloves for vibration damping which prevents damage to blood capillaries in the fingers and hand caused by handling strong shock and vibrating equipment.

Other uses include self sealing enclosures for splicing electrical and telephone cables and wires. For example, the crystal gels can be pre-formed into a small diameter tubing within an outer elastic tubing, both the internal crystal gel tubing and external elastic tubing can be axially expanded and fixed in place by a removable continuous retainer. Upon insertion of a spliced pair or bundle of cables or wires, the retainer can be removed, as the retainer is removed, the crystal gel and elastic tubing impinges onto the inserted cables or wires splices, thereby sealing the electrical splices against weather, water, dirt, corrosives and shielding the splice from external abuse. The enclosure is completed without the use of heat or flame as is conventionally performed.

Because of their improved resistance to tearing, the crystal gels do not tear as readily as amorphous gels when used as dental floss. The dental floss can be almost any shape so long as it is suitable for dental flossing. A thick shaped piece of the composition can be stretched into a thin shape and used for flossing. A thinner shaped piece would require less stretching, etc. For purposes of dental flossing, while flossing between two closely adjacent teeth, especially between two adjacent teeth with substantial contact points and more especially between two adjacent teeth with substantial amalgam alloy metal contact points showing no gap between the teeth, it is critical that the crystal gel resist tearing, shearing, and crazing while being stretched to a high degree in such situations. For example, dental crystal gel floss can take the form of a disk where the segments of the circumference of the disk is stretched for flossing between the teeth. Other shaped articles suitable for flossing include threads, strips, yarns, tapes, etc., mentioned above.

In order for crystal gels to be useful as a dental floss, it must overcome the difficult barriers of high shearing and high tearing under extreme elongation and tension loads. The difficulties that the crystal gels must overcome during flossing can be viewed as follows: during the action of flossing, the crystal gel is stretched from no less than about 200% to about 1,100% or higher, the crystal gel floss is deformed as it is pulled down with tearing action between the contacting surfaces of the teeth, then, the wedge of crystal gel floss is sheared between the inner contacting surfaces of the teeth, and finally, the elongated wedged of crystal gel floss is pulled upwards and out between the surfaces of the teeth. The forces encountered in the act of flossing are: tension, shearing, tearing under extreme tension.

The use of crystal gels advances the flossing art by providing strong, soft, and more tear resistant gels than amorphous gels. Floss made from the crystal gels has many advantages over conventional dental floss such as regular and extra fine waxed and unwaxed nylon floss, spongy nylon fiber floss, and waxed and unwaxed expanded and unexpended teflon floss. Such conventional floss are not recommended for use by children, since a slip or sudden snap in forcing the floss between the teeth may cause injury to the gums which often times results in bleeding. For sensitive gums and inflamed gums which has become red and puffy, it is difficult to floss at, near, and below the gumline. The soft crystal gel floss with softness substantially matching the softness of the gums are of great advantage for use by children and for flossing teeth surrounded by sensitive and tender gums.

In all cases, the tear strength of crystal gels are higher than that of amorphous gels. The rigidities of the crystal gels for use as dental floss advantageously should be selected to exhibit a propagating tear force (when propagating a tear as measured at 180° U bend around a 5.0 mm diameter mandrel attached to a spring scale) of at least about 1 Kg/cm, more advantageously at least 2 Kg/cm, and still more advantageously of about 3 Kg/cm and higher. For any gel to be considered useful for flossing, the gels should exhibit tear strengths of at least 2 Kg/cm and higher, advantageously of at least 4 Kg/cm and higher, more advantageously of at least 6 Kg/cm and higher, exceptionally more advantageously of at least 8 Kg/cm and higher. Typically, the tear propagation strength should range from about 5 Kg/cm to about 20 Kg/cm and higher, more typically from about less than 5 Kg/cm to about 25 Kg/cm and higher, especially more typically form about less than 6 Kg/cm to about 30 Kg/cm and higher, and exceptionally more typically from about less than 8 Kg/cm to about 35 Kg/cm and higher.

For any gel to be considered useful for flossing, the gels, critically, should advantageously exhibit a propagating tension tear force (when a cylindrical sample is notched and a tear is initiated at the notched area and propagated past its maximum cylindrical diameter by length-wise stretching of the cylindrical sample) of at least about 1 Kg/cm, more advantageously at least 2 Kg/cm, and still more advantageously of about 4 Kg/cm and higher. Although the crystal gels of the present invention have improved tear resistance and resistance to fatigue greater than the amorphous gels at corresponding gel rigidities, the high and ultra-high tear resistant gels of my other related parent and c-i-p applications typically will exhibit even higher tear resistance values.

While advantageous components and formulation ranges based on the desired properties of the crystal gels have been disclosed herein. Persons of skill in the art can extend these ranges using appropriate material according to the principles discussed herein. All such variations and deviations which rely on the teachings through which the present invention has advanced the art are considered to be within the spirit and scope of the present invention.

The invention is further illustrated by means of the following illustrative embodiments, which are given for purpose of illustration only and are not meant to limit the invention to the particular components and amounts disclosed.

EXAMPLE I

Gels of 100 parts of high viscosity linear Kraton G1651 (amorphous SEBS), Septon 8006 (amorphous SEBS), and a high viscosity radial amorphous midblock segment $(SEB)_n$ triblock copolymers and 1,600, 1,200, 1,000, 800, 600, 500, 450, 300, 250 parts by weight of Duraprime 200 white oil (plasticizer) are melt blended and samples molded, the bulk gel rigidities are found to be within the range of 2 to 1,800 gram Bloom and the tensile strength, notched tear strength, and resistance to fatigue are found to decrease with increase amounts of plasticizers.

EXAMPLE II

Example I is repeated using high viscosity crystalline midblock segment linear SEBS and radial $(SEB)_n$ triblock copolymers with ethylene to butylene midblock ratios (E:B) of 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34 and 65:35, the bulk gel rigidities are found to be within the range of 2 gram to 1,800 gram Bloom and the notched tear strength and resistance to fatigue of the gel at corresponding rigidities are found to be greater than that of amorphous gels of Example I.

EXAMPLE III

Gels of 100 parts of Kraton G1651 (amorphous SEBS), Septon 8006 (amorphous SEBS), and a high viscosity amorphous midblock segment $(SEB)_n$ linear and radial triblock copolymers, 1,600, 1,200, 1,000, 800, 600, 500, 450, 300, 250 parts by weight of Duraprime 200 white oil (plasticizer), and 10 parts of Dow polydimethylsiloxane are melt blended and samples molded, the bulk gel rigidities are found to be within the range of 2 to 1,800 gram Bloom and the tensile strength, notched tear strength, and resistance to fatigue are found to decrease with increase amounts of plasticizers.

EXAMPLE IV

Gels of 100 parts of Kraton G1651 (amorphous SEBS), Septon 8006 (amorphous SEBS), and a high viscosity amorphous midblock segment $(SEB)_n$ linear and radial triblock copolymers, 1,600, 1,200, 1,000, 800, 600, 500, 450, 300, 250 parts by weight of Duraprime 200 white oil (plasticizer), and 2 parts of Dupont Teflon AF 1600 are melt blended and samples molded, the bulk gel rigidities are found to be within the range of 2 to 1,800 gram Bloom and the tensile strength, notched tear strength, and resistance to fatigue are found to decrease with increase amounts of plasticizers.

EXAMPLE V

Example III is repeated using high viscosity crystalline midblock segment linear SEBS and radial $(SEB)_n$ triblock copolymers with ethylene to butylene midblock ratios (E:B) of 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34 and 65:35, the bulk gel rigidities are found to be within the range of 2 gram to 1,800 gram Bloom and the notched tear strength and resistance to fatigue of the gel at corresponding rigidities are found to be greater than that of amorphous gels of Example III.

EXAMPLE VI

Example IV is repeated using high viscosity crystalline midblock segment linear SEBS and radial $(SEB)_n$ triblock copolymers with ethylene to butylene midblock ratios (E:B) of 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34 and 65:35, the bulk gel rigidities are found to be within the range of 2 gram to 1,800 gram Bloom and the notched tear strength and resistance to fatigue of the gel at corresponding rigidities are found to be greater than that of amorphous gels of Example IV.

EXAMPLE VII

Example II is repeated and minor amounts of 2, 5, 10 and 15 parts of the following polymers are formulated with each of the triblock copolymers: styrene-butadiene-styrene block copolymers, styrene-isoprene-styrene block copolymers, low viscosity styrene-ethylene-butylene-styrene block copolymers, styrene-ethylene-propylene block copolymers, styrene-ethylene-propylene-styrene block copolymers, styrene-butadiene, styrene-isoprene, polyethyleneoxide, poly(dimethylphenylene oxide), polystyrene, polybutylene, polyethylene, polypropylene, high ethylene content EPDM, amorphous copolymers based on 2,2-bistrifluoromethyl-4, 5-difuoro-1,3-dioxole/tetrafluoroethylene. The bulk gel rigidities of each of the formulations are found to be within the range of 2 gram to 2,000 gram Bloom and the notched tear strength and resistance to fatigue of the gels at corresponding rigidities are found to be greater than that of amorphous gels of Example I formulated with corresponding amounts of the same polymers.

EXAMPLE VIII

Molten gels of Examples I–VII are formed into composites with paper, foam, plastic, elastomers, fabric, metal, concrete, wood, glass, ceramics, synthetic resin, synthetic fibers, and refractory materials and the resistance to fatigue of the composite-crystal gels at corresponding rigidities are found to be greater than that of the composite-amorphous gels.

EXAMPLE IX

Three cm thick sheets of each of the crystal gels of Example II and the amorphous gels of Example I are tested by repeatedly displacing the sheets to a depth of 1 cm using a 10 cm diameter smooth (water soaked) wood plunger for 1,000, 5,000, 10,000, 25,000, 50,000, and 100,000 cycles. The sheets of crystal gels are found capable of exhibiting greater fatigue resistance than the sheets of amorphous gels at corresponding rigidities.

While preferred components and formulation ranges have been disclosed herein persons of skill in the art can extend these ranges using appropriate material according to the principles discussed herein. Furthermore, Crystalline midblock segment SEBS block polymers can be use in blending with other engineering plastics and elastomeric polymers to make alloyed compositions having improved impact and tear resistance properties. All such variations and deviations which rely on the teachings through which the present invention has advanced the art are considered to be within the spirit and scope of the present invention.

What I claim is:

1. An improved gelatinous composition comprising: a crystal gel formed from (i) 100 parts by weight of one or more substantially amorphous high viscosity triblock copolymers of the general configurations poly(styrene-ethylene-butylene-styrene), poly(styrene-ethylene-propylene-styrene), diblock copolymers of the general configurations poly(styrene-ethylene-butylene), poly(styrene-ethylene-propylene) or a mixture thereof, said triblock and diblock copolymers having a non-crystalline ethylene-butylene and ethylene-propylene midblock segment respectively in combination with (ii) a minor amount of less than about 20 parts by weight of a highly crystalline ethylene-butylene midblock segment triblock copolymer of the configuration poly(styrene-ethylene-butylene-styrene); (iii) from about 250 to about 1,600 parts of a plasticizer sufficient to achieve a gel rigidity of from less than about 2 gram Bloom to about 1,800 gram Bloom; wherein said crystalline ethylene-butylene midblock copolymer segment of said (ii) triblock copolymer having a selected amount of crystallinity sufficient to achieve improvements in one or more properties including improved tear resistance and improved resistance to fatigue; wherein said improvements in properties of said crystal gel being greater than an amorphous gel at corresponding said gel rigidity formed from said (i) triblock or diblock copolymers having a substantially non-crystalline ethylene-butylene and ethylene-propylene midblock segments; (iv) optionally in combination with a selected amount of one or more of a selected polymer or copolymer said gelatinous composition exhibiting a tear strength of at least 1 kg/cm.

2. A gel according to claim 1, wherein said midblock copolymer segment having a crystallinity of at least about 10% by weight of said ethylene-butylene midblock copolymer segment.

3. A gel according to claim 1, wherein said midblock copolymer segment having a crystallinity of at least about 15% by weight of said ethylene-butylene midblock copolymer segment.

4. An improved gelatinous composition comprising: a crystal gel formed from (i) 100 parts by weight of one or more high viscosity triblock copolymers of the general configurations poly(styrene-ethylene-propylene-styrene), diblock copolymers of the general configurations poly(styrene-ethylene-propylene) or a mixture thereof, said triblock and diblock copolymers having a non-crystalline ethylene-propylene midblock segment in combination with (ii) a minor amount of less than about 98 parts by weight of a highly crystalline ethylene-butylene midblock segment triblock copolymer of the configuration poly(styrene-ethylene-butylene-styrene); (iii) a selected amount of from about 250 to about 1,600 parts of a plasticizer sufficient to achieve a gel rigidity of from less than about 2 gram Bloom to about 1,800 gram Bloom; wherein said crystalline ethylene-butylene being a midblock copolymer segment of said (ii) triblock copolymers having a selected amount of crystallinity sufficient to achieve improvements in tear resistance as measured using a 180° U-bend tear propagation test, said improvement in tear resistance of said crystal gel being greater than an amorphous gel at corresponding said gel rigidity formed from said (i) triblock or diblock copolymers having a non-crystalline ethylene-propylene midblock segments; (iv) optionally in combination with a selected amount of one or more of a selected polymer or copolymer.

5. An improved gelatinous composition comprising: a crystal gel formed from (i) 100 parts by weight of one or more high viscosity triblock copolymers of the general configurations poly(styrene-ethylene-butylene-styrene), poly(styrene-ethylene-propylene-styrene), diblock copolymers of the general configurations poly(styrene-ethylene-butylene), poly(styrene-ethylene-propylene) or a mixture thereof, said triblock and diblock copolymers having a non-crystalline ethylene-butylene and ethylene-propylene midblock segment respectively in combination with (ii) a minor amount of less than about 20 parts by weight of a highly crystalline ethylene-butylene midblock segment triblock copolymer of the configuration poly(styrene-ethylene-butylene-styrene); (iii) a selected amount of from about 250 to about 1,600 parts of a plasticizer sufficient to achieve a gel rigidity of from less than about 2 gram Bloom to about 1,800 gram Bloom; wherein said crystalline ethylene-butylene being a midblock copolymer segment of said (ii) triblock copolymers having a selected amount of crystallinity sufficient to achieve improvements in one or more properties including improved tear resistance and improved resistance to fatigue; wherein said improvements in properties of said crystal gel being greater than an amorphous gel at corresponding said gel rigidity formed from said (i) triblock or diblock copolymers having a substantially non-crystalline ethylene-butylene and ethylene-propylene midblock segments; wherein said selected amount of crystallinity is capable of exhibiting a broad melting endotherm in differential scanning calorimeter (DCS) curves as seen on heating and a sharp crystallization exotherm as seen on cooling; (iv) optionally in combination with a selected amount of one or more of a selected polymer or copolymer.

6. A gel according to claim 5, wherein said gel exhibits in differential scanning calorimeter (DCS) a melting endotherm of about 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., or 80° C.

7. An improved gelatinous composition comprising: a crystal gel formed from (i) 100 parts by weight of one or more high viscosity triblock copolymers of the general configurations poly(styrene-ethylene-butylene-styrene), poly(styrene-ethylene-propylene-styrene), diblock copolymers of the general configurations poly(styrene-ethylene-butylene), poly(styrene-ethylene-propylene) or a mixture thereof, said triblock and diblock copolymers having a non-crystalline ethylene-butylene and ethylene-propylene midblock segment respectively in combination with (ii) a minor amount of less than about 20 parts by weight of a highly crystalline ethylene-butylene midblock segment triblock copolymer of the configuration poly(styrene-ethylene-butylene-styrene); (iii) a selected amount of from about 250 to about 1,600 parts of a plasticizer sufficient to achieve a gel rigidity of from less than about 2 gram Bloom to about 1,800 gram Bloom; wherein said crystalline ethylene-butylene being a midblock copolymer segment of said (i) triblock copolymers having a selected amount of crystallinity sufficient to achieve improvements in one or more properties including improved tear resistance and improved resistance to fatigue; wherein said improvements in properties of said crystal gel being greater than an amorphous gel at corresponding said gel rigidity formed from said (i) triblock copolymers having a substantially non-crystalline ethylene-butylene and ethylene-propylene midblock segments; wherein said selected amount of crystallinity is capable of exhibiting a broad melting endotherm in differential scanning calorimeter (DCS) curves as seen on heating and a sharp crystallization exotherm as seen on cooling; (iv) optionally in combination with a selected amount of one or more polymer or copolymer of poly(styrene-butadiene-styrene), poly(styrene-butadiene), poly(styrene-isoprene-styrene), poly(styrene-isoprene), poly(styrene-ethylene-propylene), poly(styrene-ethylene-propylene-styrene), poly (styrene-ethylene-butylene-styrene), poly(styrene-ethylene-butylene), poly(styrene-ethylene-propylene)n, poly(styrene-ethylene-butylene)n, maleated poly(styrene-ethylene-propylene-styrene), maleated poly(styrene-ethylene-butylene-styrene), maleated poly(styrene-ethylene-butylene), maleated poly(styrene-ethylene-propylene)n, maleated poly(styrene-ethylene-butylene)n, polystyrene, polybutylene, poly(ethylene-propylene), poly(ethylene-butylene), polypropylene, polyethylene, polyethyleneoxide, poly(dimethylphenylene oxide), copolymers of trifluoromethyl-4,5-difuoro-1,3-dioxole and tetrafluoroethylene, tetrafluoroethylene, polycarbonate, ethylene vinyl alcohol copolymer, polyamide or polydimethylsiloxane; wherein said copolymer is a linear, branched, radial, or a multiarm copolymer.

8. A gel according to claim 7, wherein said gel is being denoted by G, is physically interlocked with a selected material M forming the combination $G_nM_n$, $G_nM_nG_n$, $M_nG_nM_n$, $M_nG_nG_nM_n$, $G_nM_nM_nG_n$, $G_nM_nG_nM_nG_n$, $M_nM_nM_nG_n$, $M_nM_nM_nG_nM_nM_nM_n$ or a permutation of one or more of said $G_n$ with $M_n$; wherein when n is a subscript of M, n is the same or different selected from the group consisting of paper, foam, plastic, fabric, metal, metal foil, concrete, wood, glass, glass fibers, ceramics, synthetic resin, synthetic fibers or refractory materials; and wherein when n is a subscript of G, n denotes the same or a different gel rigidity.

9. A gel according to claim 6, wherein said gel being formed into a shape floss suitable for use as a dental floss.

* * * * *